United States Patent [19]

Goldman et al.

[11] Patent Number: 5,684,951
[45] Date of Patent: Nov. 4, 1997

[54] METHOD AND SYSTEM FOR USER AUTHORIZATION OVER A MULTI-USER COMPUTER SYSTEM

[75] Inventors: Jonathan Goldman, Menlo Park; Garry Saperstein, Sunnyvale, both of Calif.

[73] Assignee: Synopsys, Inc., Mountain View, Calif.

[21] Appl. No.: 619,892

[22] Filed: Mar. 20, 1996

[51] Int. Cl.$^6$ .................................................. G06F 11/00
[52] U.S. Cl. ........................... 395/188.01; 395/187.01; 395/609
[58] Field of Search .................. 395/188.01, 187.01, 395/186, 200.06, 606, 609, 610; 380/30, 3; 379/145

[56] References Cited

U.S. PATENT DOCUMENTS

| | | | |
|---|---|---|---|
| Re. 34,954 | 5/1995 | Haber et al. | 380/49 |
| 4,876,716 | 10/1989 | Okamoto | 380/21 |
| 5,136,642 | 8/1992 | Kawamura et al. | 380/21 |
| 5,251,258 | 10/1993 | Tanaka | 380/21 |
| 5,261,052 | 11/1993 | Shimamoto | 395/200 |
| 5,398,285 | 3/1995 | Borgelt et al. | 380/30 |
| 5,457,746 | 10/1995 | Dolphin | 380/4 |
| 5,465,300 | 11/1995 | Altschuler et al. | 380/30 |
| 5,550,984 | 8/1996 | Gelb | 395/200.17 |
| 5,557,678 | 9/1996 | Ganesan | 380/21 |
| 5,598,470 | 1/1997 | Cooper et al. | 380/4 |
| 5,598,536 | 1/1997 | Slaughter, III et al. | 395/200.16 |
| 5,623,601 | 4/1997 | Vu | 395/187.01 |

OTHER PUBLICATIONS

Title: Secure Access to Data Over the Internet; Authors: Eric Bina et al.; pp. 99–102; Date: Sep. 1994.
Title: Dynamically Selecting Protocols for Socket Applications; Author: David M. Ogle et al.; pp. 48–57; Date: May 1993.
Ari Lvotonen, Access Authorization Ovaview, Dec./1993, World Wide Web Document Chttp://www. w3:org/pub/www/Access Authorization/Overview.html).

*Primary Examiner*—Robert W. Beausoliel, Jr.
*Assistant Examiner*—Scott Baderman
*Attorney, Agent, or Firm*—Wagner, Murabito & Hao

[57] ABSTRACT

A method and system for performing user authorization in a multi-user computer system. The novel method has particular application to the multi-user internet protocol. Within the system, an application contains a list of registered users. For each registered user, the application stores a user identification, an email (electronic mail) address, and a database containing each authorized IP address for that user. When a user requests access to the application over the multi-user system, the application requires the user to input a user identification value and, simultaneously, the application accesses the user's current IP address (e.g., the user's internet domain address) over the multi-user system. The application attempts to validate the user identification, and if valid, the application examines its database to determine if the user is authorized for its current IP address. If so, access is permitted. If the user identification is valid but the current IP address is not authorized, the application determines a validation key ("key") based on the user identification and the current IP address. The pseudo unique key is then forwarded via the email protocol to the user's known email address. The user then is required to enter that key into the application to authorized the current IP address. Security is provided because (1) given a user identification, which can be stolen, the unauthorized user also needs to access the application using an authorized IP address and (2) email is used to transmit the keys to the user to a known user email address.

21 Claims, 12 Drawing Sheets

METHOD AND SYSTEM FOR USER AUTHORIZATION OVER A MULTI-USER COMPUTER SYSTEM

BACKGROUND OF THE INVENTION

(1) Field of the Invention

The present invention relates to the field of user validation within a computer system. In particular, the present invention relates to user validation with respect to a multi-user computer system ("network").

(2) Prior Art

In multi-user networked computer systems (e.g., within the internet protocol), an application program ("application") is available to a large number of unregulated users over the network. Typically for a given application, only a subset of the total number of users on the network are authorized to enter and use the application. In these cases, the application is required to perform some type of user validation or authentication which is designed to discriminate among the attempted users of the application so that only authorized or validated users are permitted entry. The user authentication system is typically implemented at user logon time, or, as the case with stateless systems, user authentication is performed upon each transaction between the user and the application because there is no memory of prior transactions in stateless systems.

In the past, one method of user authentication required a user password that was given to each authorized user and entry to the application was denied to any user without the password. However, user passwords and user identification codes can be readily compromised over a multi-user computer system. Once a password is stolen for a particular user, entry to the application is then compromised and detection of the unauthorized entry can go unrecorded in these prior art systems. What is needed is a user authentication system that offers security of access even if a user password or identification is stolen. What is also needed is an authentication system that effectively records and flags unauthorized entry. The present invention provides such security.

In one particular prior art system, a user is requested to input a user identification (e.g., a user name or handle), a personal password, and a user email address (e.g., using smtp, simple mail transport protocol, over the internet). A generated key is then forwarded to the email address of the user. The user then accesses the email message and inputs the key to the application to gain entry. Once access is granted, the user uses the user identification and password to gain entry. The application is entered using the internet and http, hypertext transfer protocol. However, this system can be compromised because an unauthorized user knowing the user's identification and password can gain entry to the application. Further, this prior art system does not take into account the unique address of the computer system employed by the user to communicate with the application. What is needed is a system that does not allow this type of breach of security by preventing unauthorized email addresses from being entered by a user. The present invention provides such a system.

Accordingly, the present invention provides a user validation system that offers entry security even if a user password or identification number is compromised. Further, the present invention offers a user validation system that not only safe guards against unauthorized entry, but also effectively records and flags unauthorized entries to authorized users. Further, the present invention provides the above user validation system that also does not allow the entry of unauthorized email addresses by unauthorized users. These and other advantages of the present invention not specifically described above will become clear within discussions of the present invention herein.

SUMMARY OF THE INVENTION

A method and system are described for performing user validation in a multi-user computer system. The present invention has particular application to the multi-user internet protocol. Within the system, an application contains a list of registered users. For each registered user, the application stores a user identification number, an email (electronic mail) address, and a database containing each validated IP address for that user. The email address is obtained off-line during user registration. When a user requests access to the application over the multi-user system (e.g., using http), the application requires the user to input a user identification value and, simultaneously, the application accesses the user's current IP address (e.g., the user's internet domain address) over the multi-user system. The application attempts to validate the user identification, and if valid, the application examines its database to determine if the user is authorized for its current IP address. If so, access is permitted. If the user identification is not valid, access is denied. If the user identification is valid, but the current IP address is not authorized, the application determines a validation key ("key") based on the user identification and the current IP address. A procedure is used to determine the pseudo unique key such that it cannot be readily guessed knowing the user identification and the current IP address. The key is then forwarded over the multi-user system via the email internet application (e.g., smtp) to the user's known email address. The user then is required to access the user's email and enter that key into the application to authorize the current IP address. Security is provided because (1) given a user identification, which can be stolen, the unauthorized user also needs to access the application using a validated IP address and (2) email (a "present" rather than demand system) is used to transmit the key to the user at a known user address that is not given on-line.

Specifically, embodiments of the present invention include a method in a computer system, the method authorizing a user for access to an application system and comprising the steps of: requesting a user identification from a user, the step of requesting performed over a first interface protocol of the multi-user computer system; accessing an address identifying a computer system employed by the user to originate access requests; generating a key for the user and specific to the address, the key based on the address and the user identification; transferring the key to the user via a second interface protocol of the multi-user computer system; receiving a user entered validation value from the user over the first interface protocol of the multi-user computer system; and granting access of the application system to the user if the user entered validation value equals the key for that address and user identification.

Embodiments include the above and wherein the multi-user computer system utilizes an internet protocol and wherein the first interface protocol is the world wide web internet application using the hypertext transfer protocol (http) and wherein the second interface protocol is the electronic mail internet application using the simple mail transport protocol (smtp). Embodiments include the above and wherein the step of generating the key comprises the steps of: accessing a secret code string; concatenating the secret code string, the user identification, and the address to generate a first value; and performing a first procedure upon the first value to produce a fixed length pseudo unique value corresponding to the first value wherein said pseudo unique value is said key. Embodiments also include a computer system implemented in accordance with the above.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail to avoid unnecessarily obscuring aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

COMPUTER SYSTEM 112

Figure 1:
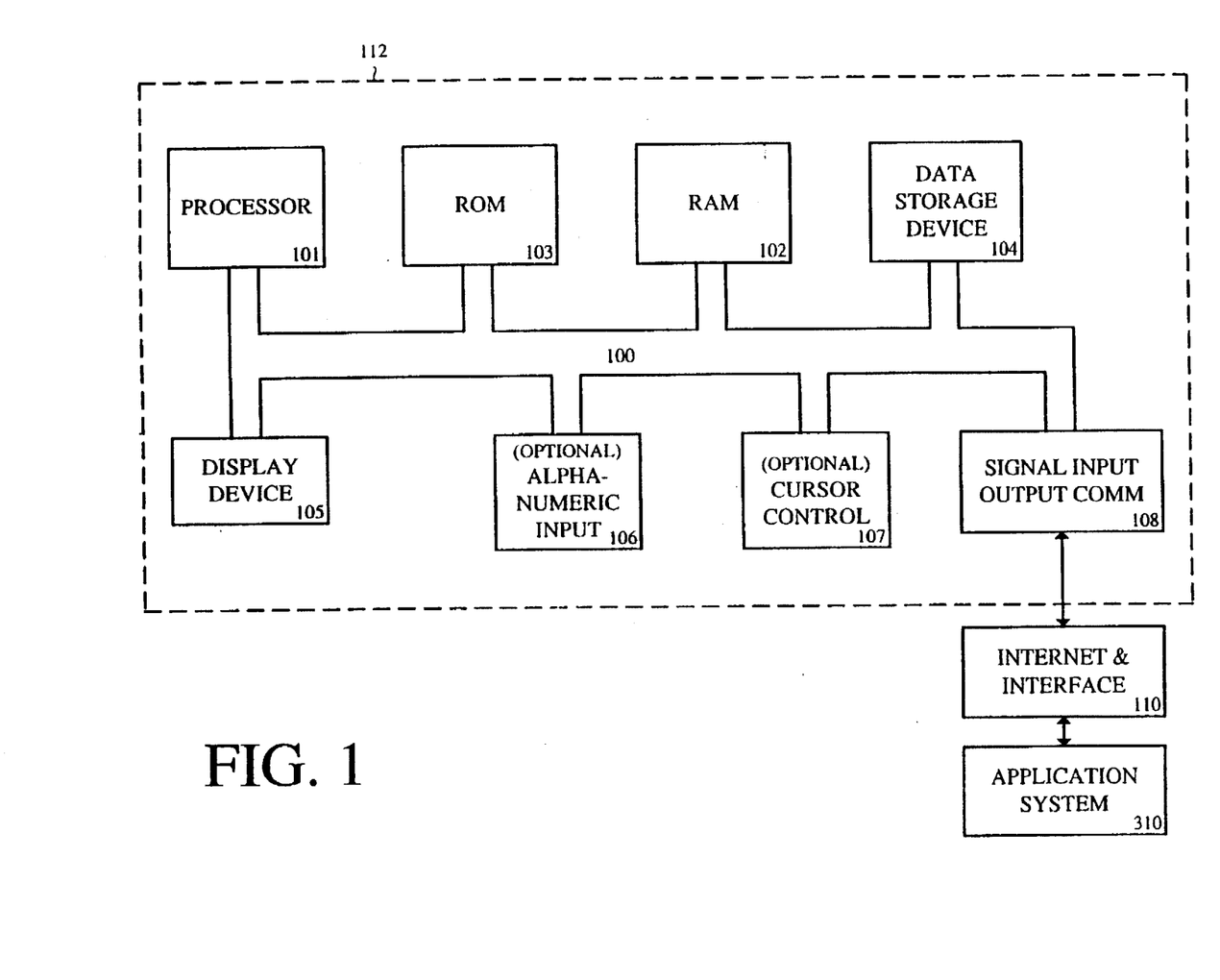
FIG. 1 illustrates an exemplary hardware configuration that can be used in accordance with the present invention validation system.

With reference to the user validation system of the present invention, as described below, aspects of the present invention are described in terms of steps executed on a computer system. Although a variety of different computer systems can be used with the present invention, an exemplary computer system 112 is shown in FIG. 1. In general, computer systems 112 that can be used by the present invention comprise an address/data bus 100 for communicating information, a central processor 101 coupled with the bus for processing information and instructions, a volatile memory 102 (e.g., random access memory) coupled with the bus 100 for storing information and instructions for the central processor 101, a non-volatile memory 103 (e.g., read only memory) coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an optional alphanumeric input device 106 including alphanumeric and function keys coupled to the bus 100 for communicating information and command selections to the central processor 101, an optional cursor control device 107 coupled to the bus for communicating user input information and command selections to the central processor 101, and a signal generating device 108 coupled to the bus 100 for interfacing with other networked computer systems.

The display device 105 of FIG. 1 utilized with the computer system 112 of the present invention may be a liquid crystal device, cathode ray tube, or other display device suitable for creating graphic images and alphanumeric characters recognizable to the user. Also coupled to the signal generating device is a multi-user network interface (e.g., an internet interface) which couples computer system 112 to a multi-user system (e.g., the internet in one embodiment of the present invention). Interface 110 is coupled to communicate with an application system 310. It is appreciated that the application system 310 contains a hardware platform (e.g., analogous to computer system 112) which executes instructions to implement the application program. The present invention user validation system gives the application system 310 a level of security to help prevent unauthorized entry of the application system 310 over the internet interface 110.

PRESENT INVENTION COMMUNICATION INTERFACES

Figure 2:
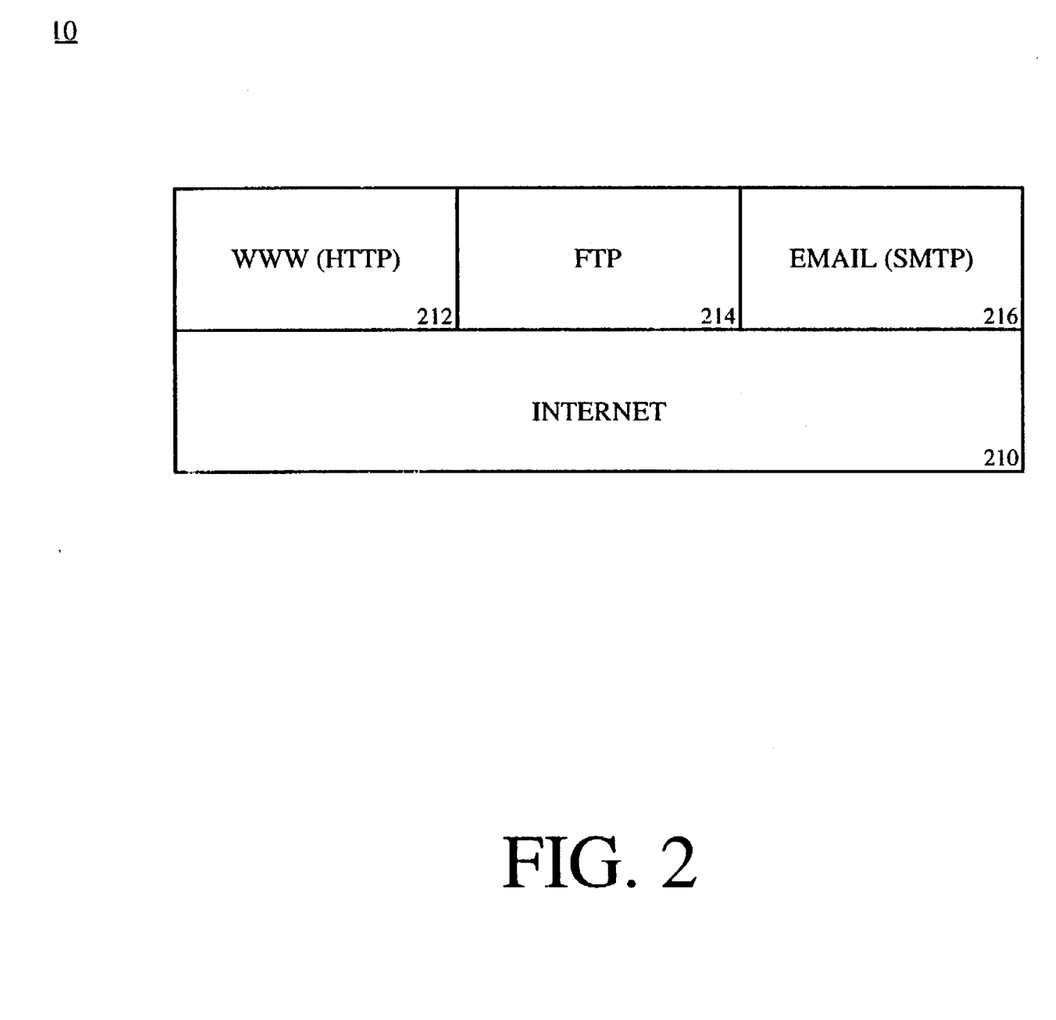
FIG. 2 is a logical block diagram of different protocols accessible over an exemplary internet multi-user computer system in accordance with the present invention.

With reference to FIG. 2, the internet interface 110 (FIG. 1) is described in more detail. The internet 210 is a well known connection of world wide computer systems that operate using the well known internet protocol. The internet 210 is one type of multi-user computer system. Other internet applications (e.g., using specific protocols) operate on top of the internet protocol. One such application is the well known world wide web or www internet application 212 which operates using the hypertext transfer protocol or http. The www internet application 212 is a "demand system" in which a user requests information from a site and the site transfers the information back to the user on-line. Also well known is the email internet application 216 which operates using the simple mail transport protocol or smtp. The email internet application 216 is a "present system" in that an information transfer command originates from a sender site and information pursuant that command is presented to the target email address. Another internet application is the file transfer internet application 214 which operates using the file transfer protocol, ftp. In one embodiment, the present invention user validation system utilizes the www 212 and email 216 internet applications as well as the internet protocol 210. Other embodiments of the present invention are implemented in other multi-user computer environments.

Figure 3A:
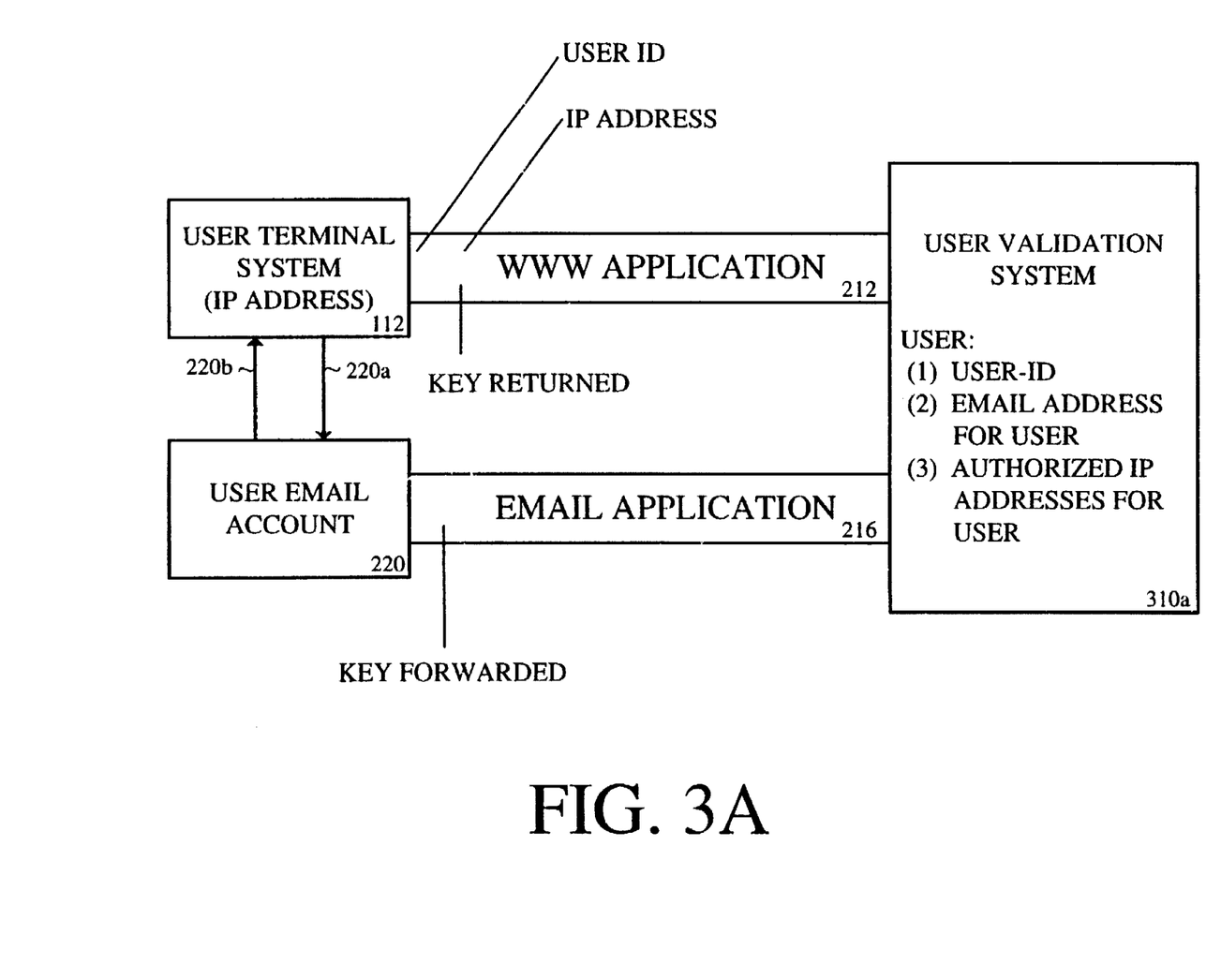
FIG. 3A is a logical block diagram illustrating two different communication protocols (e.g., www using http and email using smtp) that are used by a user to communicate with the validation system in accordance with the preset invention.

FIG. 3A illustrates a logical diagram of the present invention user validation system 310a in combination with a user terminal system 112 (user system), the user's email account 220, and elements of the internet interface 110 (FIG. 1). The user terminal system 112 (FIG. 1) is used by the user to originate access requests to the application system 310 (which contains validation system 310a). FIG. 3A specifically illustrates pertinent information transfers and communication interfaces in accordance with the present invention. The user system 112 is assigned a unique internet domain address number ("IP address") by the internet interface 110. In one embodiment, the IP address is composed of four octet wide addresses to produce a 32 bits wide address. The user system 112 is communicatively coupled to the user validation system 310a using the www internet application 212 and the email internet application 216.

Although shown as a single system in FIG. 3A, the user can utilize a number of different user systems to communicate with the user validation system 310a of the present invention. In this case, the user can be validated for and from a number of different IP addresses. Within the present invention, the user is allowed a number of different user systems 112 (FIG. 1) and each is recorded by the present invention. However, it is understood that of the recognized accounts, the present invention selects a particular mail account 220 for communicating a validation key ("key"). It is appreciated that the user system 112 contains software to implement a forms-capable browser allowing the user to browse sites having forms (also called "screens" herein) over the internet 110 (FIG. 1) using the www internet application 212 running http.

The user validation system 310a of FIG. 3A is a part of the application system 310 of FIG. 1 and functions to regulate the use of application system 310 to authorized users only. The user system 112 is also coupled to communicate with a user email account 220 which contains messages for the user that are received over the email internet application 216. During validation, a user identification value (user ID), the IP address of the user system 112 (IP address), and a user-returned key (validation value) are supplied by the user over the www internet application 212. The email internet application 216 is also used during user validation. Specifically, the user validation system 310a originates the key and forwards it to the user via the email internet application 216.

As shown by FIG. 3A, the user validation system 310a of the present invention maintains a database having an entry for each authorized user. Each entry includes the user's identification (user ID), the user's email address, and each IP address for which the user is authorized. This information is described in more detail to follow. The user's email address is known to the user validation system 310a upon user registration. During the validation process, the user validation system 310a does not request the user email address from the user over the internet interface 110 (FIG. 1) to prevent entry of unauthorized email addresses.

Figure 3B:
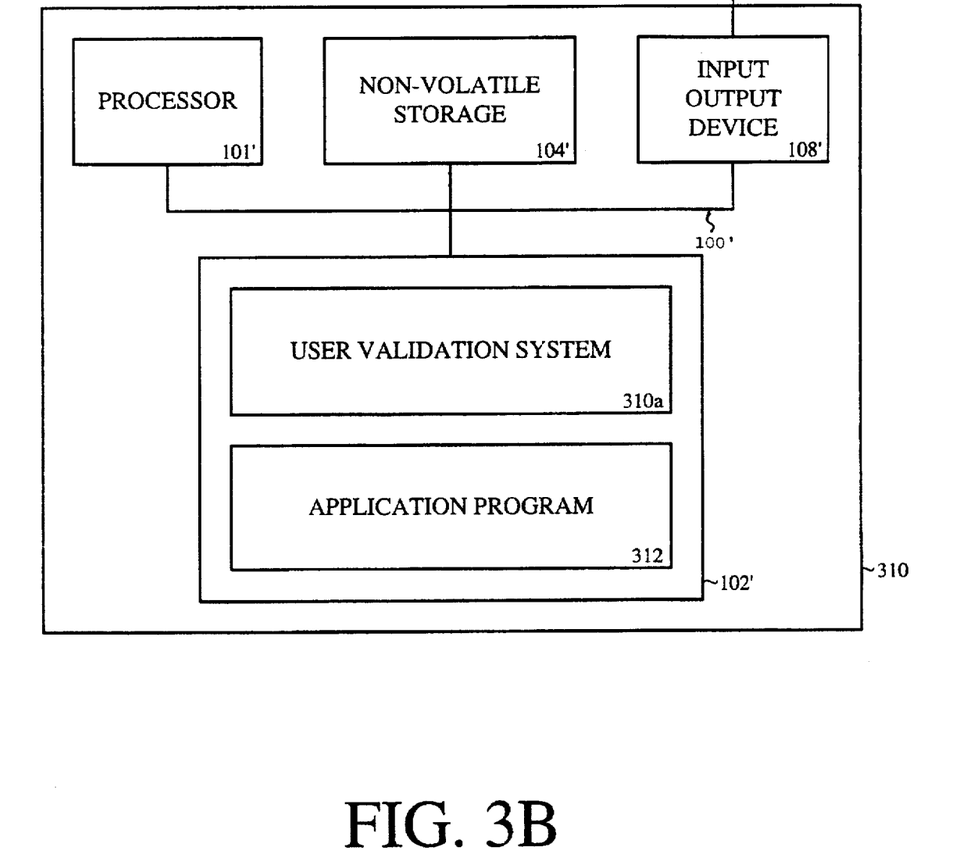
FIG. 3B is a logical block diagram of components of the application system 310 of the present invention.

FIG. 3B illustrates components of the application system 310 (FIG. 1) of the present invention. Included are a processor 101', a non-volatile information storage unit 104', and an input/output device 108', each coupled to a bus 100'. Also coupled to the bus 100' is a computer readable memory unit 102' which contains program code to implement the user validation system 310a. Memory 102' can optionally also include the application program 312. The input/output device 108' couples to the internet and interface block 110 (FIG. 1).

USER VALIDATION USER SCREENS AND MESSAGES

Figure 4A:
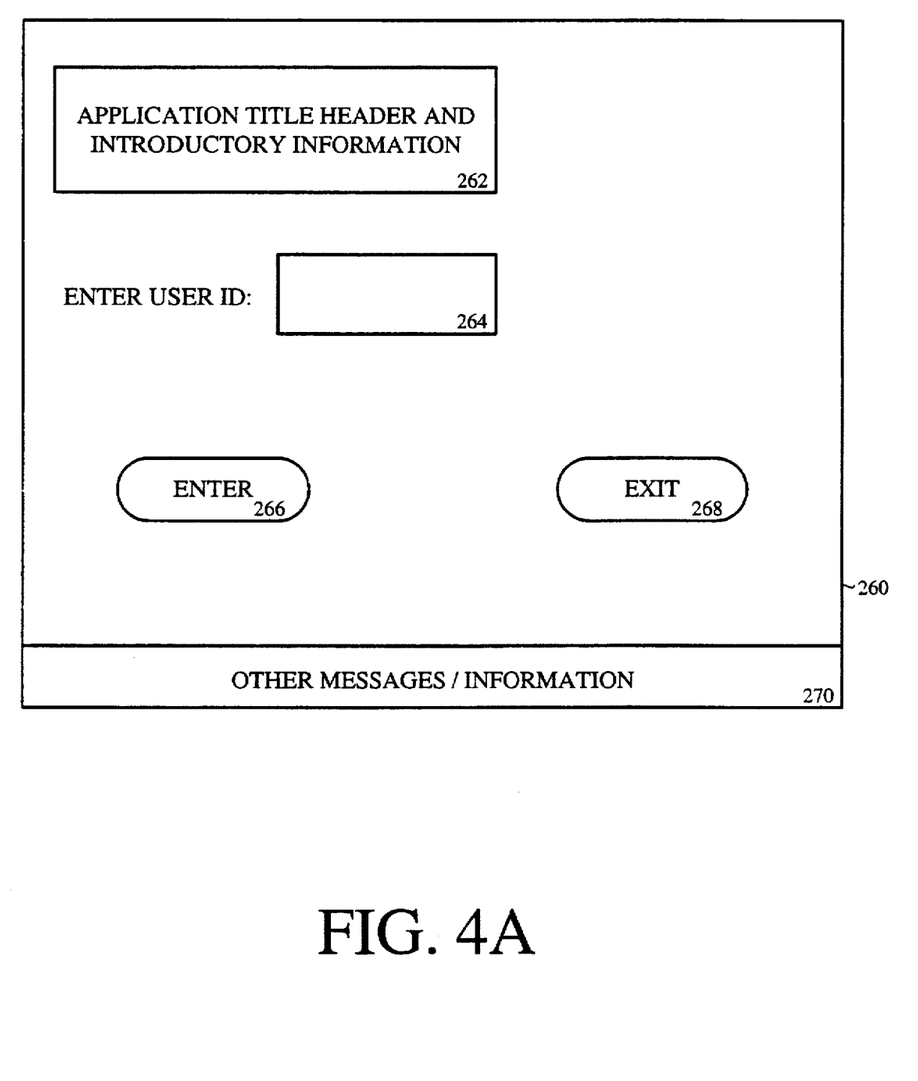
FIG. 4A illustrates an exemplary user identification screen ("form") in accordance with the validation system of the present invention.

During user validation, the present invention user validation system 310a (FIG. 3A) utilizes several display screens (also called "forms") and messages that are rendered to the user (e.g., over display device 105 of FIG. 1). With reference to FIG. 4A, the user identification screen 260 is illustrated. Upon an attempted access to the application system 310 (FIG. 1), the user validation system 310a generates the user identification screen 260 to the user to access the user's user ID. The screen 260 contains a message header 262 indicating the purpose of the screen and optionally contains instructions and introductory information. An input field 264 is displayed to receive the user ID from the user. An enter button 266 is optionally displayed that can be activated to accept the user ID when the user ID is completely entered by the user. An exit button 268 is also optionally provided to clear the user ID or to exit the screen 260. Other messages and/or internet (e.g. www) addresses can be displayed in optional message field 270.

If application system 310 (FIG. 1) is a connection system, then screen 260 is only displayed upon initial user logon. If application system 310 is a stateless system, then screen 260 is displayed upon the initial access to application system 310 by the user. The initial access to application system 310 opens an http access window (also known as an http form) on the user system 112 (FIG. 1). In accordance with one embodiment of the present invention (e.g., with regard to the stateless system), screen 260 will not be displayed again for subsequent user transactions unless the user closes the http internet access window to the application system 310. In a stateless system, for each transaction between the user and the application system 310, the present invention embeds the user ID value into the http access window in a text string whose input type is hidden. In this way, each transaction performed by the user using the http access window of the present invention automatically transmits the user's user ID.

Figure 4B:
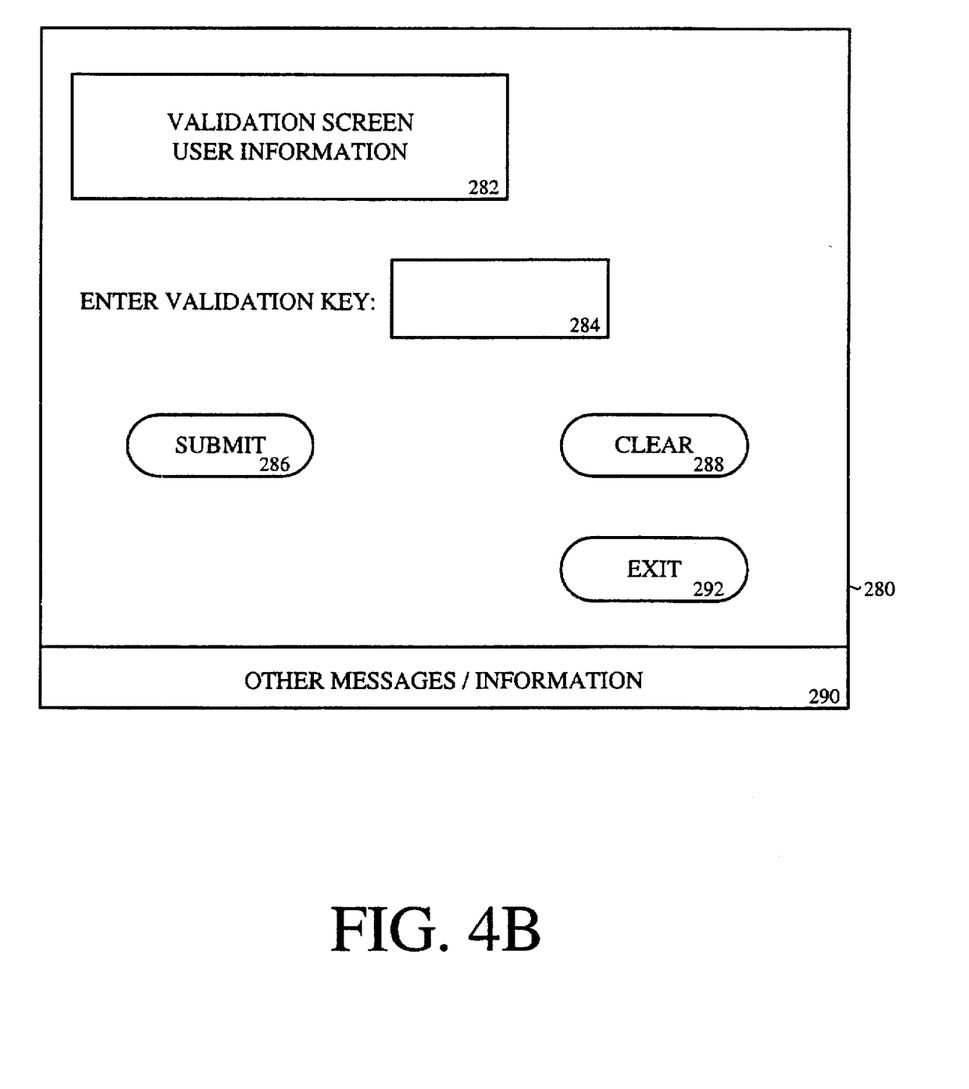
FIG. 4B illustrates an exemplary IP address validation screen ("form") in accordance with the validation system of the present invention.

If user validation is required (described further below), the present invention displays to the user a user validation screen 280 as shown in FIG. 4B. The user validation screen 280 contains a message header 282 which optionally contains instructions and other information for the user. It is appreciated that message header 282 contains instructions to the user indicating that a key is being forwarded from the user validation system 310a (FIG. 3A) to the user's known email address. An information field 284 receives the validation value that is to be entered by the user. The user is instructed to obtain the key from the user's email account 220 (FIG. 3A) and input that key into information field 284 of the validation screen 280. The value entered into information field 284 is the user entered validation value. Once the validation value is entered, a submit button 286 can be activated by the user to present the validation value to user validation system 310a. A clear button 288 is optionally provided to erase an incorrect key entered at field 284. Other messages and/or internet (e.g., www) addresses can be displayed in optional message field 290. The user is able to exit the validation screen 280 without entering a key by invoking the exit button 292.

Figure 5:
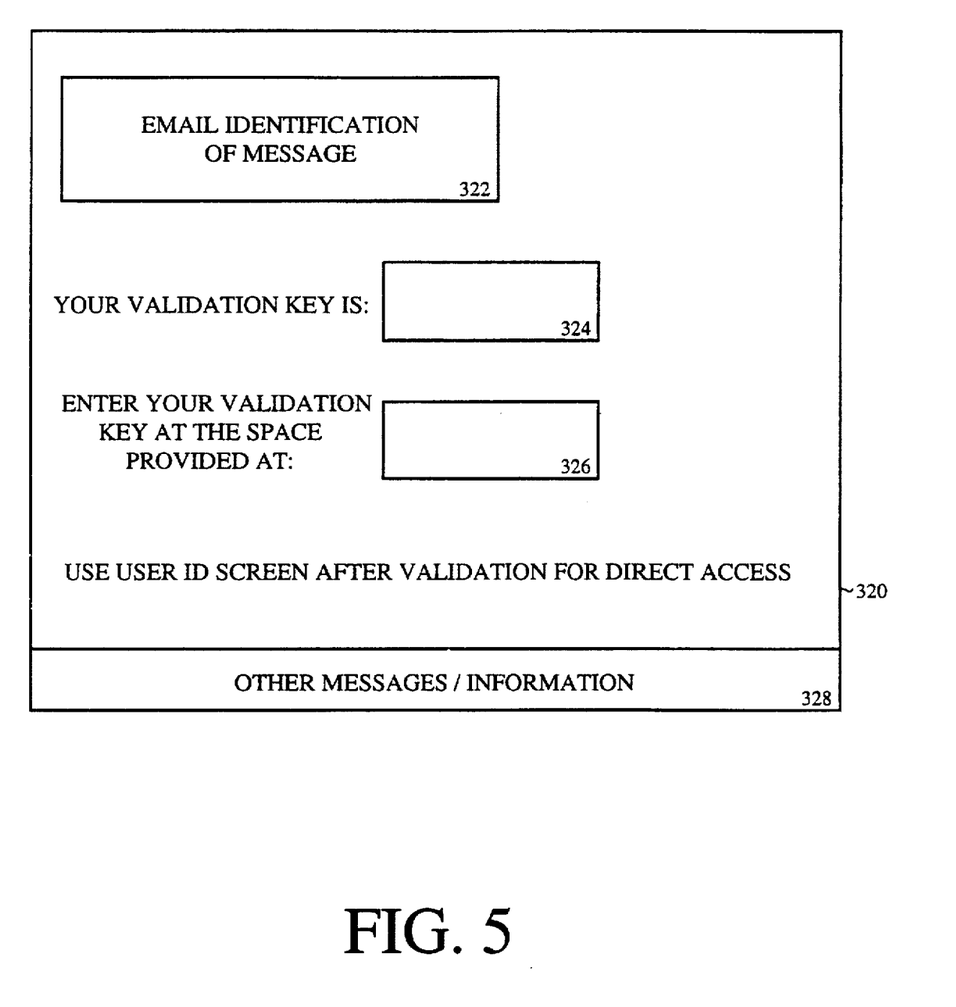
FIG. 5 illustrates an exemplary email validation message containing a key in accordance with the present invention.

FIG. 5 illustrates an exemplary message format of the present invention validation message that is forwarded from the user validation system 310a (FIG. 3A), over the email internet application 216 (FIG. 3A), to the user's known user email address. The validation message format 320 in one embodiment is a text file and contains a message header 322 indicating the nature of the message (e.g., validation for the application system 310 of FIG. 1) and other optional instructions. Importantly, the message format 320 contains the transmitted key in information field 324 for the user. As discussed further below, the key is pseudo unique to the user ID and the user's current IP address. The validation message format 320 also contains an internet address (e.g., in the form of a Uniform Resource Locator or URL format) within information field 326. The internet address (e.g., URL) in field 326 specifies the address (e.g., URL) at which the validation screen 280 (FIG. 4B) is located. The user is instructed to return to this internet address (e.g., URL) to enter the key of field 324. The user is also instructed by validation message 320 that the user identification screen 260 (FIG. 4A) allows direct access to the application system 310 after validation is complete for this current IP address. Other messages and/or internet (e.g., www) addresses can be displayed in optional message field 328.

USER VALIDATION PROCEDURE OF THE PRESENT INVENTION

Figure 6:
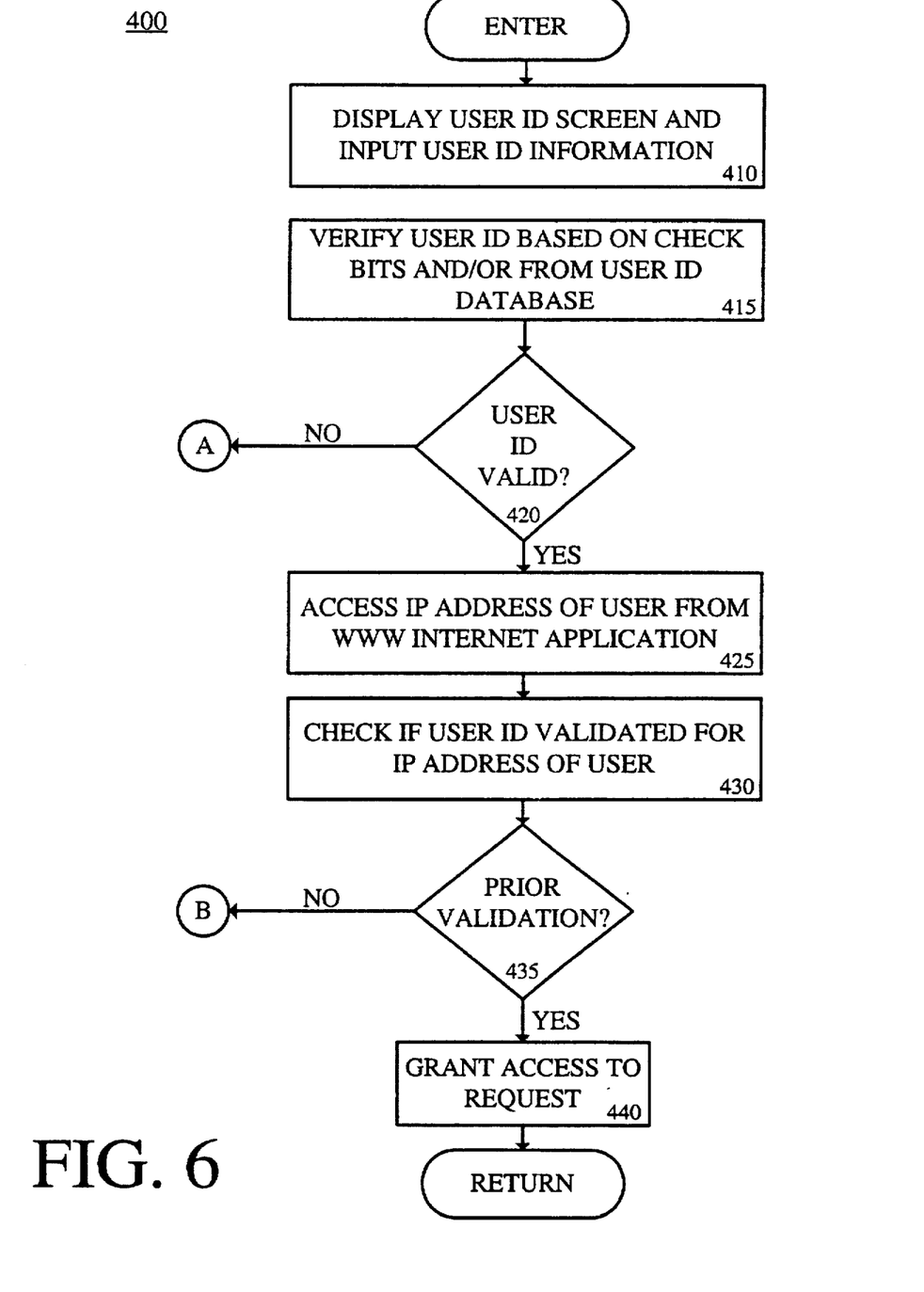
FIG. 6 illustrates a flow diagram of steps of the present invention validation method including steps for accessing a user identification and validating the user's current IP address.

FIG. 6 illustrates steps of the user validation procedure 400 of the present invention operable within the user validation system 310a (FIG. 3A) of the application system 310 (FIG. 1). At step 410, the present invention responds to a user attempt to enter the application system 310 by displaying the user identification screen 260 (FIG. 4A) to the user over the www internet application 212 (FIG. 3A) using http. At step 410, the present invention receives the user's user ID from the user identification screen 260. At step 415, the present invention verifies the received user ID based on a method including check bits stored within the user ID and/or by checking a database of recognized user IDs stored in a memory unit of the application system 310. At step 420, if the received user ID is not a valid and/or recognized user ID to the application system 310, process flow is transferred to label "A" (see FIG. 7).

With reference to FIG. 6, if the received user ID is a valid and recognized user ID, the present invention at step 425 accesses the user's current IP address over the internet interface 110 (FIG. 1). With respect to one embodiment of the present invention, the process of obtaining a user's IP address from the www internet application 212 (FIG. 3A) using http is well known. At step 430, the present invention accesses the user validation database using the user's user ID as an index to obtain a list of validated IP addresses for this user. The validation database is stored in a memory unit (e.g., RAM, disk, etc.) of the application system 310. At step 435, the present invention checks to determine if the user's current IP address is among the IP addresses of the list of authorized IP addresses for this user. If the current IP address is found in the list of authorized IP addresses, then the current IP address has been authorized in a prior session and processing continues to step 440. If the current IP address is not found in the list of authorized IP addresses, then the current IP address has not been validated in a prior session and processing continues to label "B" (see FIG. 8). At step 440 of FIG. 6, the user's user ID is valid and the user's current IP address was previously authorized. With these two circumstances, the user validation system 310a of the present invention grants access of the application system 310 to the user. At step 440, the present invention has recognized the user and acknowledged that the user is originating a request from a known and recognized site.

Figure 7:
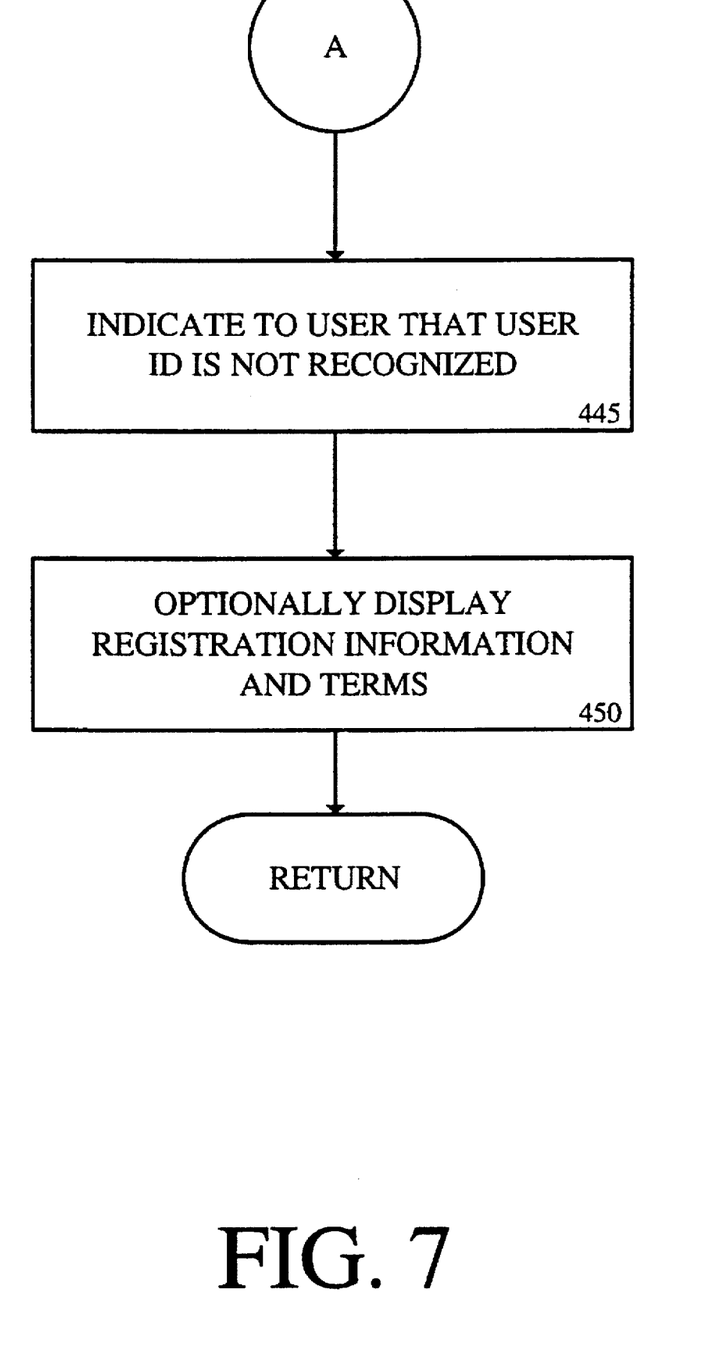
FIG. 7 illustrates steps of the present invention validation method for an invalid user identification.

FIG. 7 illustrates the steps of the present invention user validation process 400 performed upon detection of an invalid and/or unrecognized user ID. At step 445, the present invention indicates to the user that the input user ID is not recognized and that entry to the application system 310 (FIG. 1) is currently denied. At step 450, the present invention can optionally display registration information (and terms) to the user on how to become an authorized user. At step 450, the present invention can also optionally return the user to the user identification screen 260 (FIG. 4A) to retry the user ID in case the wrong value was entered as the user's user ID.

Figure 8:
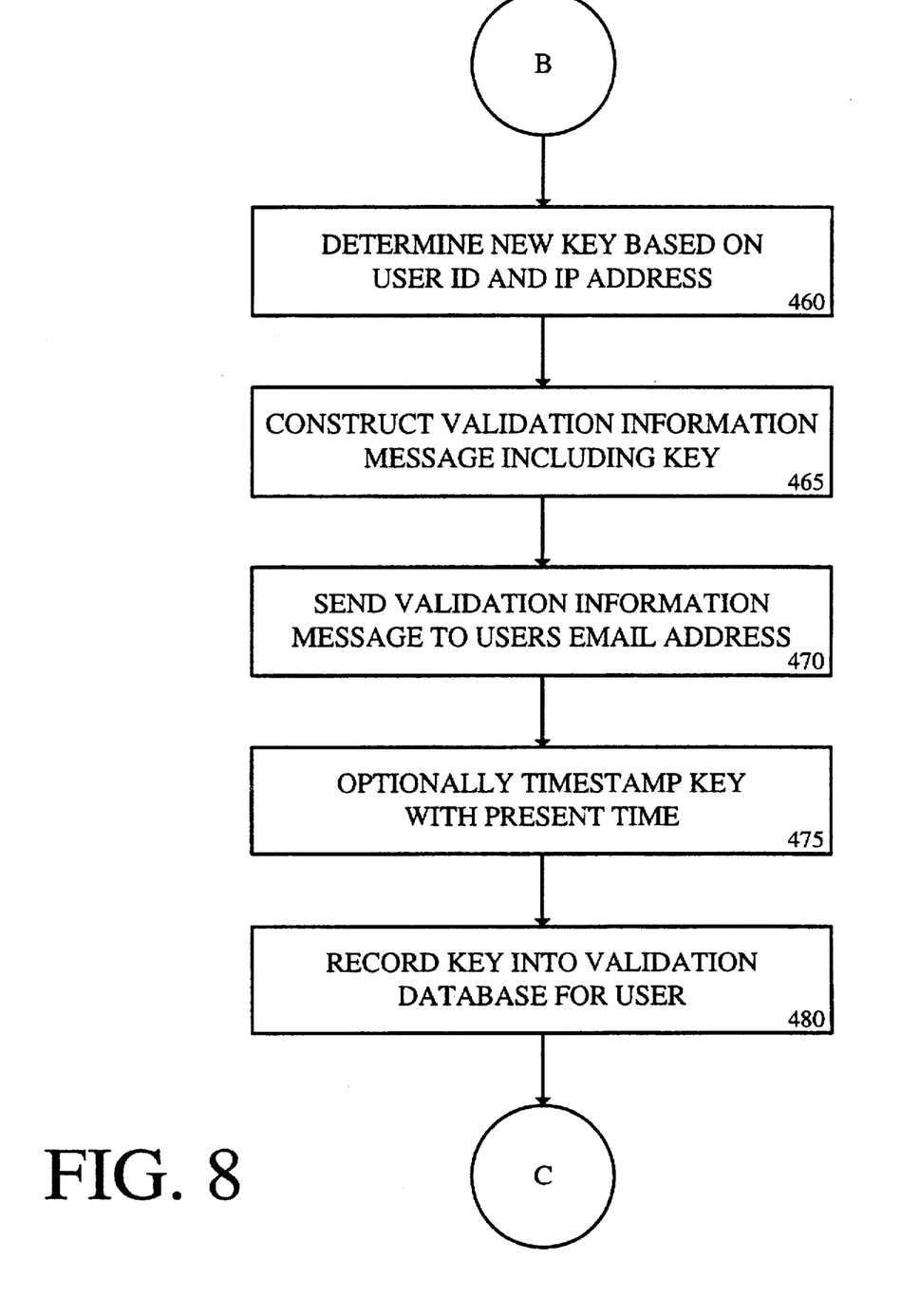
FIG. 8 is a flow diagram of steps of the present invention method for determining a new key for an unrecognized user IP address.

FIG. 8 illustrates the steps of the present invention user validation process 400 performed for the instances when a user ID is recognized and valid, the but the user's current IP address has not been previously authorized. In this case, the attempted entry to the application system 310 (FIG. 1) is suspect because the user is using a user system 112 (FIG. 1) that is not recognized by the user validation system 310a (FIG. 3A) of the present invention. This scenario may be the result of an unauthorized user using a valid but stolen user ID to gain access to the application system 310. In this instance, the present invention generates a key for the new IP address and forwards the key to the user's known user email address. In this way, the key is not broadcast over the www internet application 212 (FIG. 3A) where the unauthorized user has access. Instead, the key is forwarded to a known authorized email address. In this manner, the unauthorized user needs to have access to the authorized user's email account to retrieve the key. In the vast majority of unauthorized entry attempts, the unauthorized user does not have access to the email account of the authorized user. Also, by forwarding a message to the authorized user's email account, the present invention effectively informs the authorized user of the attempted unauthorized entry.

The process of FIG. 8 starts at step 460 where the present invention determines a new key for the user based on the user's user ID and the current IP address of the user. Many different procedures can be used to determine the key as long as the key is difficult to predict based on the user's user ID and the current IP address of the user. One method is shown in pseudo code below:

```
generate_validation_key:
    secret = secret_coded_string
    user_id = user's user ID
    ip_address = current IP address of user
    key = user_id + ip_address + secret
    key = md5_hash(key)
    validation_key = key
    return validation_key
```

The above pseudo Code utilizes the well known md5 hash function (also referred to as a message digest function) to generate a fixed length output based on a variable length input, however, a number of different hash functions can alternatively be used at step 460. In one embodiment of the present invention, the hash function generates a 128 bit output code based on the input code. One hash function in particular that can be used within the scope of the present invention is described in a paper entitled "Message Authentication with MD5," published within CryptoBytes, 1 (1), 5–8, Spring 1995 and is authored by Burr Kaliski and Matt Robshaw.

In one embodiment of the present invention, the input code is a concatenation of the user ID, the current IP address and a secret code (e.g., secret), however, addition can also be used. The hash function generates a pseudo unique output in that there is an extremely low likelihood that any two input patterns (e.g., in this case user_id+ip_address+secret) generate the same output (e.g., the key). The value, secret, is an arbitrary string of alpha-numeric characters.

In an alternative embodiment of the present invention, the input to the hash function can also include an indication (e.g., a coded timestamp) of the present time of day or the present date to increase the unpredictability of the key result. In the above embodiment, the input code to the hash function is a concatenation of the user ID, the current IP address, the secret code (e.g., secret), and the coded timestamp.

After generating a new key based on the user's user ID and the users current IP address, the present invention at step 465 of FIG. 8 constructs the validation message 320 (FIG. 5) which includes the newly determined key. The validation message 320, as described above, instructs the user to enter the enclosed key into the proper information field of the validation screen 280 (FIG. 4B) in order to validate the user's current IP address. Once constructed, the validation message 320 is stored in computer memory.

At step 470, the present invention forwards the validation message constructed during step 465 to the user's email address. The present invention utilizes the email internet application 216 (FIG. 3A) using smtp for this function. Step 470 is typically completed very shortly after step 460. The user's email address used in step 470 is predetermined because it is not requested during an on-line session. For example, at step 470, to determine the user's email address, the present invention does not ask the user for the email address using the www internet application 212 (FIG. 3A). Rather, the user's email address is a known value given to the present invention upon authorized user registration (typically done off-line). In so doing, the integrity of the present invention is enhanced because an unauthorized user (e.g., in possession of a stolen user ID) is not given the opportunity to enter an unauthorized email address to the user validation system 310a (FIG. 3A). Optionally, at step 475, the present invention places a time-stamp with the recently generated key to implement a time-out feature. A number of well known time-stamp procedures can be used at step 475. At step 480, the present invention records the key (and the time-stamp, if any) into a validation database indexed by the user ID for later reference. Although the key is stored in the validation database, the user's IP address corresponding to this key is not yet authorized. Processing then flows to label "C" (FIG. 9).

Figure 9:
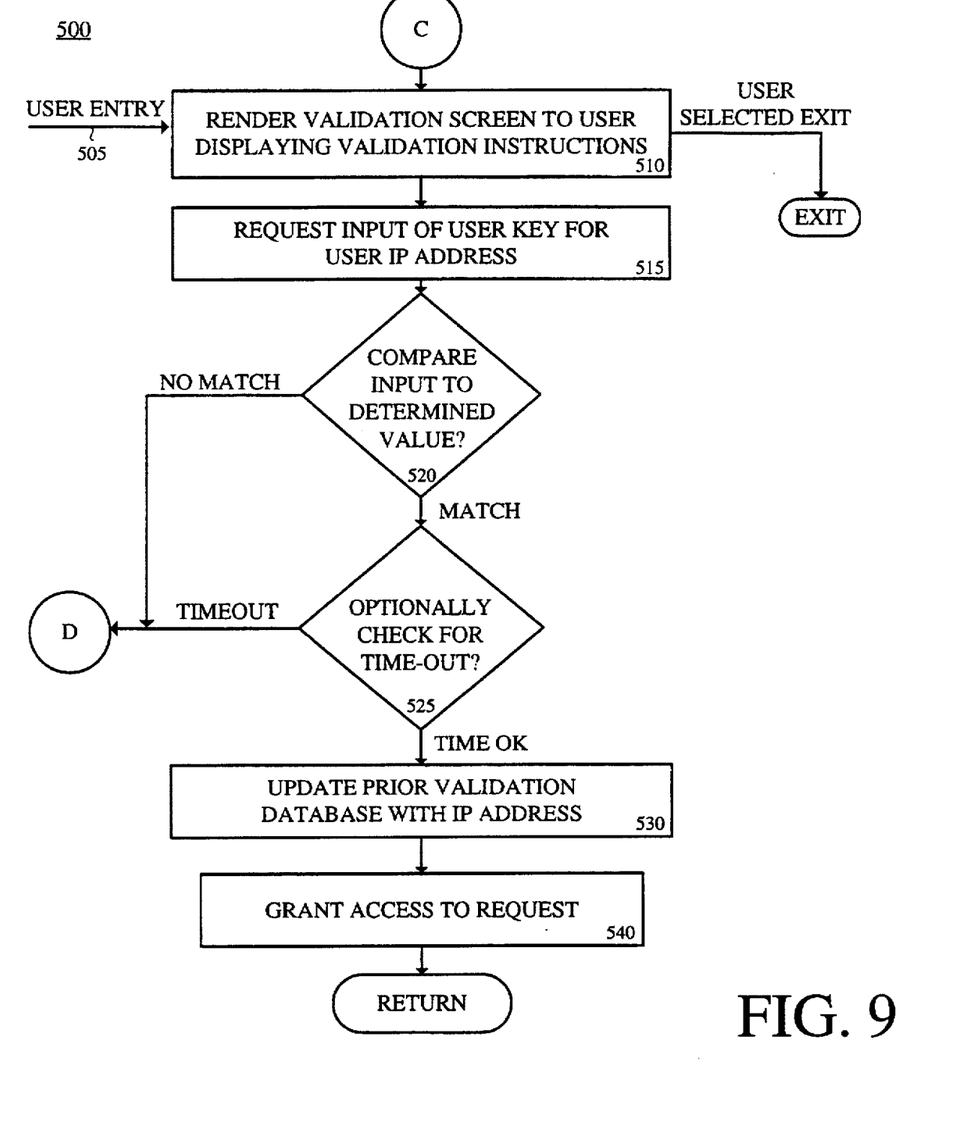
FIG. 9 illustrates steps of the present invention validation system for validating an input key from a user with respect to a user IP address.

With reference to FIG. 9, process 500 of the present invention user validation procedure is described. Step 510 of process 500 can be invoked from different entry paths. For instance, step 510 is invoked after step 480 of FIG. 8 as shown from the label "C." Step 510 is also capable of being invoked directly by the user entering the address of the validation screen 280 (FIG. 4B) over the www internet application 212 (FIG. 3A) as shown from entry path 505. Step 510 can be exited directly by the user as shown in FIG. 9 when the exit button 292 of the validation screen 280 is selected (FIG. 4B).

At step 510 of FIG. 9, the present invention generates the validation screen 280 (FIG. 4B) to the user over the www internet application 212, or suitable alternative multi-user network interface. Validation screen 280 includes validation instructions which instruct the user to inspect the user's email account (e.g., account 220 of FIG. 3A) for a new key specific to the current IP address that is currently being used by the user. The instructions inform the user to obtain the key from the user's email account and enter the key into the data field 284 of the validation screen 280. Due to multi-window computer systems, step 510 does not necessarily require the user to exit the validation screen 280 (e.g., via exit button 292), but the user can exit, if preferred. Optionally, to aid the user in this task, the address (e.g., URL) of the validation screen can be displayed in message field 290 (FIG. 4B).

At step 515, the user is cued by a message to the input the key. At step 515, the present invention accesses the key (e.g., the user entered validation value) input by the user from data input field 284 of the validation screen 280. Steps 510 and 515 can occur simultaneously. At step 520, the present invention accesses the validation database (see step 480 of FIG. 8) based on the user ID and the current IP address to obtain the stored value of the key specific to the current IP address. At step 520, if the user is currently using an unrecognized IP address (e.g., an address that is different from the IP address that was used in the processing of FIG. 8), the present invention will exit process 500 with an error message and deny entry to the application system 310 (FIG. 1).

At step 520 of FIG. 9, provided the current IP address is recognized, the present invention compares the validation value as entered by the user to the key as retrieved from the validation database for the current IP address. If a match occurs, processing flows to step 525. If no match occurs, processing flows to label "D" (see FIG. 10.)

At step 525 of FIG. 9, the present invention optionally retrieves and decodes a time-stamp placed into the key by optional step 475 (FIG. 8). Using the present time and date, the present invention, at step 525, determines the age of the key and then checks if the key age is within a predetermined allowable age window. If not, then the key is too old for use and processing flows to label "D" (see FIG. 10). If the key age is within the allowable age window, the processing flows to step 530. Entry to step 530 indicates that (1) the key is properly recognized for the recognized current IP address and (2) optionally the key has not timed out.

In one implementation of the present invention, at step 530 of FIG. 9, the present invention updates the validation database marking the current IP address as being prior authorized for the particular user ID. At this point, the current IP address of the user is authorized as indicated by the validation database. Within one embodiment, upon subsequent accesses by the user using the current IP address, the user accesses the application system 310 directly from the user identification screen 260 (FIG. 4A) without needing to enter the validation screen 280 (FIG. 4B). At step 540, the user is granted accesses to the application system 310.

Figure 10:
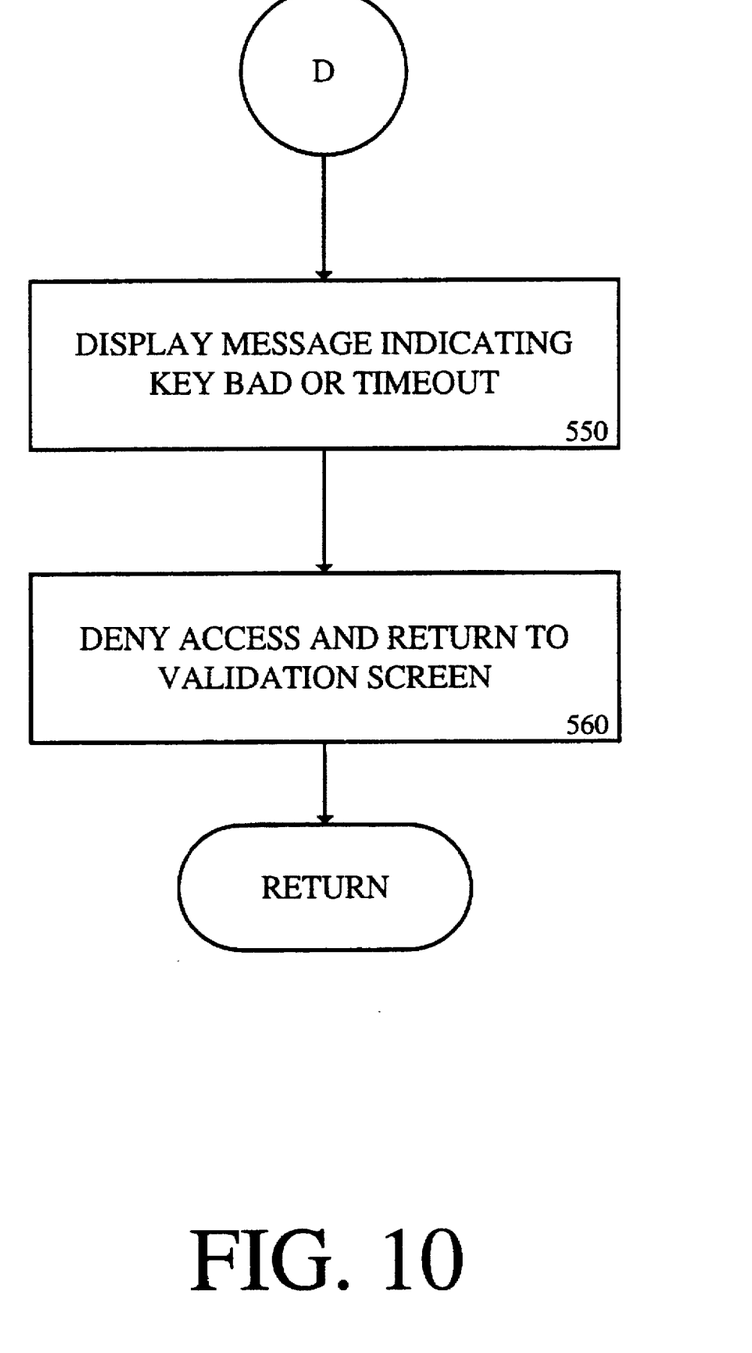
FIG. 10 illustrates steps of the present invention validation method in response to an invalid key or validation time-out.

FIG. 10 illustrates steps of the present invention in the case when the key entered by the user at step 520 is not recognized by the present invention user validation system 310a (FIG. 3A). At step 550, the present invention displays a message to the user that the key entered at step 520 is not valid or timed-out. At step 560, entry to the application system 310 (FIG. 1) is denied. Optionally, the user can be returned to the validation screen 280 of FIG. 4B (one or more of a limited number of times) for re-entry of the key in the case where the first value was entered improperly.

According to the procedures of the present invention as described above, a user validation system is described. By using the email internet application 216 (FIG. 3A) to transmit the user's key, the likelihood that the key is intercepted by an unauthorized user is reduced. Further, by requiring the user to authorize each IP address that is used to access the application system 310, the present invention adds an additional layer of security. Specifically, the present invention prevents unauthorized entry in the case where a user ID is compromised and is attempted to be used at an unrecognized IP address.

It is appreciated that once an IP address is authorized, entry to the application system 310 is allowed directly from the user identification screen 260 (FIG. 4A) using the authorized IP address.

The preferred embodiment of the present invention, a user validation system to reduce the amount of unauthorized entry of an application program over a multi-user computer system, is thus described. While the present invention has been described in particular embodiments, it should be appreciated that the present invention should not be construed as limited by such embodiments, but rather construed according to the below claims.

What is claimed is:

1. In a computer system having access to a multi-user computer system, a method of authorizing a user for access to an application system, said method comprising the steps of:

requesting a user identification from said user, said step of requesting performed over a first interface protocol of said multi-user computer system;

accessing an address identifying a computer system employed by said user to originate access requests;

determining whether said user identification is valid and response thereto denying access to said application system provided said user identification is not valid;

determining whether said address is validated for said user identification;

generating a key for said user if said address is not validated for said user identification, said key based on said address and said user identification;

transferring said key to said user via a second interface protocol of said multi-user computer system;

in response to said step of transferring, receiving a user entered validation value from said user over said first interface protocol of said multi-user computer system; and granting access of said application system to said user if said user entered validation value equals said key and validating said address for said user identification.

2. A method as described in claim 1 wherein said multi-user computer system utilizes an internet protocol.

3. A method as described in claim 2 wherein said first interface protocol is the world wide web internet application running hypertext transfer protocol (http) and wherein said second interface protocol is the electronic mail internet application running simple mail transport protocol (smtp).

4. A method as described in claim 2 wherein said step of generating said key comprises the steps of:

accessing a secret code string;

concatenating said secret code string, said user identification, and said address to generate a first value; and performing a first procedure upon said first value to produce a fixed length pseudo unique value corresponding to said first value wherein said key is said pseudo unique value.

5. A method as described in claim 4 wherein said first procedure is a hash procedure.

6. A method as described in claim 2 wherein said step of granting access to said application system if said user entered validation value equals said key comprises the steps of:

retrieving from a computer database said key indexed by said user identification and by said address;

comparing said key to said user entered validation value; and indicating if said above step of comparing indicated a match of said key to said user entered validation value.

7. A method as described in claim 2 wherein said address is an IP network domain address four octets wide.

8. A method as described in claim 3 wherein said step of transferring said key to said user via said second interface protocol of said multi-user computer system comprises the step of transferring said key to a predetermined electronic mail account of said user.

9. A method as described in claim 2 further comprising the step of embedding said user identification in all transactions originating from said user to said application system provided said user is granted access to said application system.

10. In a computer system, a method of authorizing a user for access to an application program available over a multi-user computer system using an internet protocol, said method comprising the steps of:

requesting a user identification from said user, said step of requesting performed over a first interface protocol of said multi-user computer system;

accessing an internet domain address identifying a computer system employed by said user to originate access requests;

determining whether said user identification is valid and response thereto denying access to said application system provided said user identification is not valid;

determining whether said internet domain address is validated for said user identification;

generating a key for said user if said internet domain address is not validated for said user identification, said key based on said internet domain address and said user identification;

transferring said key over an electronic mail internet application using simple mail transport protocol (smtp) to a predetermined electronic mail account of said user;

in response to said step of transferring, receiving a user entered validation value from said user over said first interface protocol of said multi-user computer system; and granting access of said application system to said user if said user entered validation value equals said key and validating said internet domain address for said user identification.

11. A method as described in claim 10 wherein said first interface protocol is the world wide web (www) internet application running hypertext transfer protocol (http).

12. A method as described in claim 10 wherein said step of generating said key comprises the steps of:

accessing a secret code of values;

concatenating said secret code, said user identification, and said internet domain address to generate a first value; and performing a first procedure upon said first value to produce a fixed length pseudo unique value corresponding to said first value, wherein said key is said pseudo unique value.

13. A method as described in claim 10 wherein said step of generating said key comprises the steps of:

accessing a secret code of values;

accessing a timestamp representing a point in time;

concatenating said secret code, said user identification, said internet domain address to generate a first value, and said timestamp; and performing a first procedure upon said first value to produce a fixed length pseudo unique value corresponding to said first value, wherein said key is said pseudo unique value.

14. A method as described in claim 12 wherein said first procedure is a hash procedure.

15. A method as described in claim 10 wherein said step of granting access to said application system if said user entered validation value equals said key comprises the steps of:

retrieving from a computer database said key indexed by said user identification and by said internet domain address;

comparing said key to said user entered validation value; and indicating a match if said above step of comparing indicated a match of said key to said user entered validation value.

16. A method as described in claim 10 wherein said internet domain address is an IP network domain address four octets wide.

17. A method as described in claim 10 further comprising the step of embedding said user identification in all transactions originating from the user to the application system provided said user is granted access to said application system.

18. A computer system having access to a multi-user computer system, said computer system comprising a processor coupled to a bus, said bus coupled to a computer readable memory unit containing a program for causing said computer system to authorize a user for access to an application system, said program comprising:

first code for requesting a user identification from said user, said first code for communicating over a first interface protocol of said multi-user computer system;

second code for accessing a user address identifying a computer system employed by said user to originate access requests;

code for determining whether said user identification is valid and response thereto denying access to said application system provided said user identification is not valid;

code for determining whether said user address is validated for said user identification;

third code for generating a key for said user if said user address is not validated for said user identification, said key based on said user address and said user identification;

fourth code for transferring said key to said user via a second interface protocol of said multi-user computer system;

fifth code, in response to said forth code, for receiving a user entered validation value from said user over said first interface protocol of said multi-user computer system; and sixth code for granting access of said application system to said user if said user entered validation value equals said key and validating said user address for said user identification.

19. A computer system as described in claim 18 wherein said multi-user computer system utilizes an internet protocol.

20. A computer system as described in claim 19 wherein said first interface protocol is the world wide web internet application running hypertext transfer protocol (http) and wherein said second interface protocol is the electronic mail internet application running simple mail transport protocol (smtp).

21. A computer system as described in claim 19 wherein said third code comprises:

seventh code for accessing a secret code string;

eight code for concatenating said secret code string, said user identification, and said user address to generate a first value; and ninth code for performing a hash procedure upon said first value to produce a fixed length pseudo unique value corresponding to said first value wherein said key is said pseudo unique value.

* * * * *